March 28, 1944. J. KRONHEIM Re. 22,461

WIRE SPRING AND SPRING STRUCTURE

Original Filed May 24, 1938

INVENTOR.
JACOB KRONHEIM
BY Gustav A. Wolff
ATTORNEY.

Reissued Mar. 28, 1944

Re. 22,461

UNITED STATES PATENT OFFICE 22,461

WIRE SPRING AND SPRING STRUCTURE

Jacob Kronheim, Cleveland Heights, Ohio, assignor to John C. Lincoln, Scottsdale, Ariz.

Original No. 2,250,486, dated July 29, 1941, Serial No. 209,713, May 24, 1938. Application for reissue December 26, 1941, Serial No. 424,537

5 Claims. (Cl. 155—179

This invention relates to flat springs of sinuous or similar shape, used for seats of upholstered furniture, cushioned automobile seats or the like, and more particularly to the type of springs described in Patent No. 2,047,411, dated July 14, 1936. Springs of this type embody an upper axially compressible and extensible seating portion, a yielding, rearwardly and downwardly extending supporting means at the front end of the seating portion, and a downwardly extending yielding supporting means at the rear end of the seating portion. The supporting means of the springs are either integrally formed with the seating portion or rigidly connected to the opposite ends thereof to effect upward bulging and longitudinal stretching of the seating portion when a load is placed thereon.

These springs are assembled to spring structures by individually mounting the springs with their supporting means upon opposite rails of an open frame so that all seating portions of the springs are situated in a plane above the frame, and by interconnecting all seating portions of the springs to a continuous seating surface, generally to be covered with padding and upholstering material and a customary roll front edge so as to insure proper mounting and holding of loose seat cushions.

As well known, construction of a roll edge and its attachment to a seating surface is a slow and costly process which necessitates employment of highly skilled labor.

The principal object of the present invention is to reduce manufacturing and labor costs in building of upholstered furniture by providing springs of improved construction and design embodying at their front seating portions elevated means substantially equal in action to that of a front roll edge.

Another object of the invention is the provision of an improved wire spring having an elevated seating portion and integral elevated means at the front of the seating portion equal in action to that of a front roll edge.

In addition, the invention has certain other marked superiorities which radically distinguish it from presently known structures. The improvements or superior characteristics embodying certain novel features of construction are clearly set forth in the following specification and the appended claims; and a preferred form of embodiment of the invention is hereinafter shown with reference to the accompanying drawing forming part of the specification.

Figure 1:
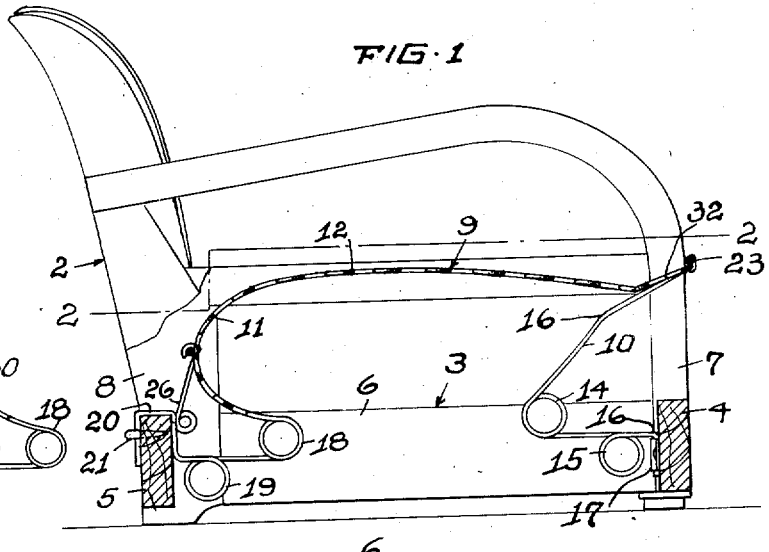
Fig. 1 shows a vertical sectional view through a spring structure mounted in the open frame of a cushioned seat, the spring structure embodying springs provided with an elevated front edge to permit of proper support of seat cushions on the padded spring structure without use of a special front roll edge; the section being taken on line 1—1 of Fig. 2.
Figure 3:
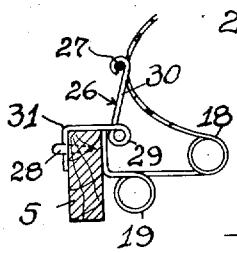
Fig. 3 is a fragmentary vertical sectional view through the rear portion of the chair base and spring structure shown in Fig. 1, the section being taken on line 3—3 of Fig. 2.
Figure 2:
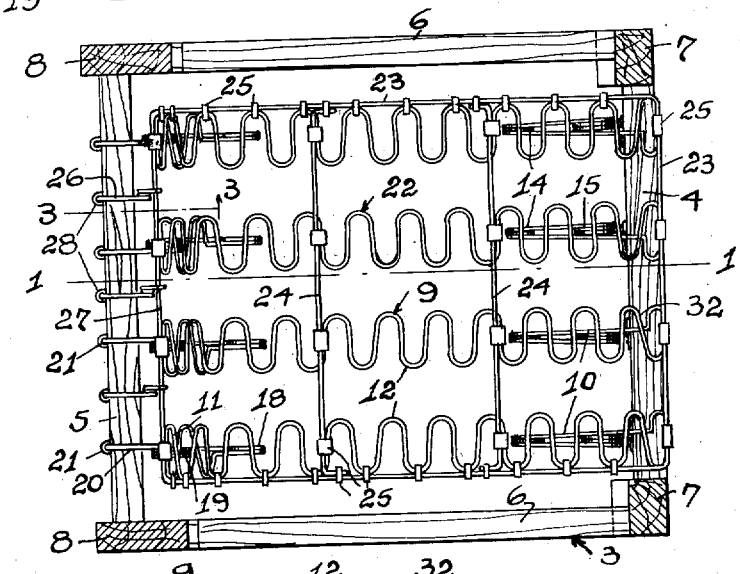
Fig. 2 is a cross sectional view through the spring structure and chair base shown in Fig. 1, the section being taken on line 2—2 of Fig. 1.
Figure 4:
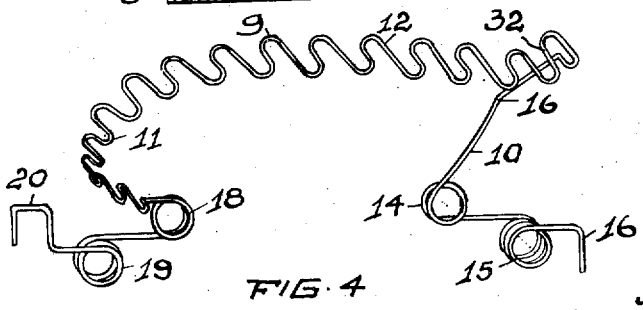
Fig. 4 is a perspective view of one of the springs used in the construction of the spring structure shown in Fig. 1.
Figure 5:
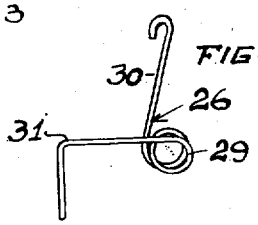
Fig. 5 is a perspective view of one of the spring hooks yieldingly tying the rear end of the spring structure to the rear rail of the open frame.

Referring now more particularly to the drawing, reference numeral 2 represents the frame of a chair embodying at its bottom portion a rectangular open frame 3, the front, rear and side rails 4, 5 and 6 of which are secured to the front and rear legs 7 and 8 of the frame 2. Open frame 2 has mounted on its front and rear rails 4 and 5 a plurality of flat springs 9, made of sinuous-shaped or horizontally corrugated steel wire. These springs each include rearwardly and downwardly inclined front and rear supporting means or lever arms 10, 11 respectively, adapted to support the proper seating portion 12 of the spring in an elevated position, which supporting means extend from the opposite ends of the said seating portion. The front supporting means or supporting arm 10 is looped at its free end to form two oppositely wound coils 14 and 15, arranged in a plane substantially rectangular to the plane of the seating surface 12, which coils are of different elasticity, coil 14 having less windings than coils 15 and therefore being stiffer than said latter coil. Preferably, as shown, front lever arm 10 is bent and offset as at 16 to prohibit contact of the coils 14 and 15 with the seating portion 12 when a load is placed upon said portion. The free end of coil 15 is extended forwardly of said coil and secured to the front rail 4 by means of an angular offset 16, metal bracket 17 being used for such purpose.

The rear supporting means 11 for the seating portion 12 is formed as a curved extension of said surface, curved at its rear portion to semi-circular shape. This rear supporting means has its free end looped to two oppositely wound coils 18 and 19, arranged in a plane substantially rectangular to the plane of the seating portion. The coils 18 and 19 are also of different elasticity, coil 18 having less windings than coil 19 and therefore being stiffer than said latter coil. The free end of coil 19 is extended rearwardly and shaped to a hook 20, adapted to engage with the rear rail 5 for supporting the rear supporting means 11 on said rail and connecting it thereto, which hook 20 is held in proper position on rail 5 by staples 21.

The above described construction of the rear supporting means 11 of the spring 9 materially simplifies manufacturing of said spring and is of great importance for spring seat structures in which the seating portions of all springs are interconnected to a substantially unitary seating surface 22 by means of an edge wire 23 and wire braces 24, which wires are secured to the springs by clips 25, all as shown in the drawing. In such spring seat structure the movement of the seating surface is mainly controlled by the rear supporting means which in the described construction has rather low resistance against forward movement of the seating surface when under load. This deficiency in the structure is overcome by the arrangement of torsion spring means 26 which pivotally engage a rearward extension 27 of the edge wire 23 and are secured to the rear rail 5 by means of staples 28. The torsion spring means 26 are made of spring steel wire and embody a coiled portion 29, having extended from its opposite ends a hook-shaped lever arm 30 and an angular resting and attachment arm 31, which latter is secured to the rail 5 in a manner previously described.

The coil 15 of the front supporting means and the coil 19 of the rear supporting means effect a substantial reduction of the forward movement of the structure under load. Thus coil 14 has less resiliency than coil 15, and coil 18, having less resiliency than coil 19, permit of the coils 15 and 19 being contracted to effect a substantially vertical downward movement of the seating surface when a load is placed thereon until the elasticity of these coils approaches that of the coils 14 and 18, whereafter all coils cooperate in the forward and downward movement of the seating surface under load. Such action of a spring seat structure is desirable, as it softens the seating surface of the spring structure and makes seating on the structure more comfortable without decreasing its efficiency in carrying heavy loads.

Spring structures of the type described are generally padded and have their front edge provided with a roll edge to give proper support to the legs of a person sitting on such structure and to properly support the customary seat cushions in such a fashion that the cushions do not slip from their support. The present spring structure embodies means which permit of discarding the edge roll to facilitate manufacturing at deceased cost. For that purpose the front part of the seating portions 12 of all springs 9 are forwardly and upwardly inclined as 32 to permit of formation of an elevated front edge on the finished seat without necessitating the slow and costly attachment of special means for building a roll edge at the front of the spring structure.

Having thus described my invention:

What I claim is:

1. A spring for cushioned seats or the like comprising a horizontally corrugated seating portion including at its front end a ledge upwardly and outwardly inclined with respect to the axis of said seating portion, a front supporting means rearwardly and downwardly extended from the front end of said ledge in inclined relation with respect thereto, and rear supporting means integrally extended from the rear end of said seating portion.

2. A spring for cushioned seats or the like comprising a horizontally corrugated seating portion including at its front end a corrugated ledge upwardly and outwardly inclined with respect to the axis of said seating portion, and inclined front and rear supporting means integrally extended from said seating portion at an inclination with respect thereto.

3. A spring for cushioned seats or the like, comprising an elongated, corrugated body portion having its one end portion upwardly and outwardly inclined to offset a part of said body portion, so that said body portion will readily follow the curved contour of the load applied in use to the spring when such spring is mounted on a frame, and yielding supporting means for said body portion extended inwardly and downwardly from the said one end portion of said corrugated body portion.

4. A spring for cushioned seats or the like, embodying an elongated, corrugated body portion having its one end portion upwardly and outwardly inclined to offset a part of said body portion and facilitate downward curving of the corrugated body portion when the spring is mounted on a frame and loaded, and a V-shaped supporting means extending at a sharp angle rearwardly and downwardly from the said one end portion of said body portion.

5. A spring for cushioned seats or the like, embodying an elongated, corrugated and upwardly curved body portion having its one end portion upwardly and outwardly inclined to offset a part of said body portion and curving the body portion near said end portion downwardly in a direction opposite to the upward curvature of said body portion to facilitate downward bulging of the body portion when the spring is secured to a frame and loaded, and a V-shaped supporting means extending at a sharp angle rearwardly and downwardly from the said one end portion of said body portion.

JACOB KRONHEIM.